US008601972B2

(12) United States Patent
Tognetti et al.

(10) Patent No.: US 8,601,972 B2
(45) **Date of Patent: *Dec. 10, 2013**

(54) AUTOMOTIVE TIRE DRESSING APPLICATOR

(75) Inventors: David L. Tognetti, Howell, MI (US); Mark D. Morin, Plymouth, MI (US); Michael J. Belanger, Novi, MI (US)

(73) Assignee: Belanger, Inc., Northville, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/332,445

(22) Filed: Dec. 21, 2011

(65) Prior Publication Data

US 2012/0090540 A1 Apr. 19, 2012

Related U.S. Application Data

(63) Continuation of application No. 12/257,881, filed on Oct. 24, 2008, now Pat. No. 8,109,227, which is a continuation-in-part of application No. 12/062,996, filed on Apr. 4, 2008, now Pat. No. 7,585,367.

(51) Int. Cl.

| | |
|---|---|
| ***B05C 1/00*** | (2006.01) |
| ***B05C 1/06*** | (2006.01) |
| ***B05C 1/08*** | (2006.01) |
| ***B08B 7/00*** | (2006.01) |
| ***B60S 3/00*** | (2006.01) |

(52) U.S. Cl.
USPC ........... 118/264; 118/218; 118/225; 118/258; 15/53.4; 134/6

(58) Field of Classification Search
USPC .......... 15/146, 179, 236, 236.1, 236.03, 53.4; 401/206, 283; 134/900, 6, 79, 83, 123, 134/255, 258; 118/216, 223, 264, 255, 258; 427/428.05, 428.08
See application file for complete search history.

(56) References Cited

U.S. PATENT DOCUMENTS

| | | | | | |
|---|---|---|---|---|---|
| 1,753,201 | A | * | 4/1930 | Edlich | 492/41 |
| 1,949,659 | A | | 3/1934 | Ritter | |
| 2,318,996 | A | * | 5/1943 | Holmes | 15/53.3 |
| 2,539,844 | A | * | 1/1951 | Kingsbury | 15/230.1 |
| 2,643,493 | A | * | 6/1953 | Zimmerman | 15/230.16 |
| 2,645,802 | A | * | 7/1953 | Mundo | 15/181 |
| 3,047,893 | A | * | 8/1962 | Anderson | 15/71 |
| 3,067,444 | A | * | 12/1962 | Donald et al. | 15/97.3 |
| 3,329,986 | A | * | 7/1967 | Hackworth | 15/179 |
| 3,417,628 | A | | 12/1968 | Paul, Jr. | |
| 3,649,985 | A | * | 3/1972 | Hunt | 15/179 |
| 3,774,259 | A | * | 11/1973 | Genaro | 15/97.3 |
| 3,800,366 | A | * | 4/1974 | Hill | 492/57 |
| 3,813,985 | A | * | 6/1974 | Perkins | 411/442 |
| 3,839,763 | A | * | 10/1974 | Gould | 15/181 |
| 3,853,677 | A | * | 12/1974 | Kai | 492/41 |
| 3,928,691 | A | | 12/1975 | Knudson | |
| 3,952,654 | A | * | 4/1976 | Evans | 101/425 |
| 4,177,611 | A | * | 12/1979 | Carr-Rollett | 451/508 |
| 4,192,036 | A | | 3/1980 | Heymann | |

(Continued)

*Primary Examiner* — Dah-Wei Yuan
*Assistant Examiner* — Karl Kurple
(74) *Attorney, Agent, or Firm* — Young Basile Hanlon & MacFarlane PC

(57) ABSTRACT

A tire dressing applicator assembly comprises a linearly arranged series of toroidally-shaped plastic rollers having one or more beveled edges and reinforced for shape retaining purposes by pins which extend axially through the bodies of the elements outboard of a center opening which is adapted to receive a support shaft.

3 Claims, 7 Drawing Sheets

(56) References Cited

U.S. PATENT DOCUMENTS

| | | | | | |
|---|---|---|---|---|---|
| 4,304,810 | A * | 12/1981 | Gates et al. | 428/218 |
| 4,515,103 | A * | 5/1985 | Greig | 118/218 |
| 4,577,364 | A * | 3/1986 | Demetriades | 15/320 |
| 4,694,523 | A * | 9/1987 | Van Brakel | 15/53.4 |
| 4,967,440 | A * | 11/1990 | Belanger | 15/DIG. 2 |
| 5,127,123 | A * | 7/1992 | Belanger | 15/53.4 |
| 5,577,291 | A * | 11/1996 | Myers et al. | 15/230.11 |
| 5,765,256 | A * | 6/1998 | Allan et al. | 15/230.12 |
| 5,784,748 | A * | 7/1998 | Belanger et al. | 15/230.14 |
| 5,983,437 | A * | 11/1999 | Wakat | 15/230.11 |
| 6,022,588 | A * | 2/2000 | Wakat | 427/262 |
| 6,109,811 | A * | 8/2000 | Song | 401/289 |
| 6,212,725 | B1 * | 4/2001 | Porat | 15/1.7 |
| 6,260,225 | B1 | 7/2001 | Bowman | |
| 6,383,295 | B1 * | 5/2002 | Frederick et al. | 118/680 |
| 6,461,429 | B1 | 10/2002 | Gorra | |
| 6,625,835 | B1 | 9/2003 | Frost et al. | |
| 7,203,989 | B2 * | 4/2007 | McLain | 15/244.1 |
| 7,716,778 | B2 * | 5/2010 | Meister | 15/230.19 |
| 7,943,201 | B2 * | 5/2011 | Hendricks, Sr. | 427/424 |
| 8,082,618 | B2 * | 12/2011 | Wentworth et al. | 15/97.3 |
| 8,142,092 | B1 * | 3/2012 | Fields | 401/9 |
| 2002/0004961 | A1 | 1/2002 | Nishina | |
| 2004/0228670 | A1 | 11/2004 | Colburn et al. | |
| 2005/0120500 | A1 * | 6/2005 | McLain | 15/230 |
| 2005/0214475 | A1 | 9/2005 | Forster et al. | |
| 2006/0251463 | A1 | 11/2006 | Isaac | |
| 2007/0011838 | A1 | 1/2007 | Davis et al. | |
| 2008/0115723 | A1 * | 5/2008 | Coates | 118/205 |
| 2008/0178402 | A1 | 7/2008 | Martines et al. | |
| 2008/0187674 | A1 | 8/2008 | Wentworth et al. | |
| 2009/0194020 | A1 | 8/2009 | Ennis | |
| 2009/0241989 | A1 * | 10/2009 | MacNeil | 134/6 |
| 2013/0078385 | A1 * | 3/2013 | Hendricks, Sr. | 427/425 |

* cited by examiner

AUTOMOTIVE TIRE DRESSING APPLICATOR

CROSS-REFERENCE TO RELATED APPLICATION

This application is a continuation of the co-pending U.S. patent application Ser. No. 12/257,881 filed Oct. 24, 2008 which is a continuation-in-part of application Ser. No. 12/062,996 filed Apr. 4, 2008 and claims priority to the earliest filing dates thereof to the extent of common patentable subject matter. The entire contents of application Ser. Nos. 12/257,881 and 12/062,996 are incorporated herein by reference.

FIELD OF THE INVENTION

This invention relates to tire dressing applicators and more particular to a generally cylindrical foam plastic applicator element as well as to an applicator assembly comprising a plurality of such elements arranged on a common support and disposed adjacent to and parallel to a path of travel for automobiles with tires to be dressed.

BACKGROUND OF THE INVENTION

Commercial car wash operations often include optional extra cost features such as undercarriage wash, rust inhibitor application and tire dressing application. One known method of tire dressing application comprises an elongate pad of foam plastic which can be saturated with tire dressing by means of internal nozzles and brought into a position where the outer surface of the pad engages the sidewall of the tires of a vehicle which is rolling past the applicator on a conveyor. This applicator is shown in U.S. Pat. Nos. 6,936,104, 6,461,685 and 6,461,429. A similar applicator, shown in U.S. Pat. No. 6,260,226, uses rotating brushes made of tightly bunched radian strands of absorbent material. Water and dressing are sprayed into the brushes in sequence.

SUMMARY OF THE INVENTION

The present invention provides an improved tire dressing applicator element in the form of a generally toroidal body of undivided foam plastic, such as polyurethane, as well as to an applicator assembly comprising a plurality of such elements arranged in a substantially continuous, end-to-end assembly, it being understood that there may be small spaces between the elements in the assembly depending on construction.

In accordance with the disclosure made herein, the applicator elements comprise lightweight, generally toroidal foam plastic bodies having a generally cylindrical outer tire contacting surface and a center opening extending axially through the body. In a commercial embodiment herein disclosed, the axial or longitudinal dimension of the tire contacting surface is on the order of 5 to 9 inches and the overall diameter of the body is on the order of 5 to 9 inches. In a preferred embodiment, at least one circular edge of the tire contacting surface is beveled.

In the preferred embodiment, the foam elements are adapted to be mounted in serial fashion on a common support such as a shaft by way of the center opening and spacers may be located on the shaft between the elements. Also in an illustrative embodiment, one or more smaller axial holes are formed in the bodies radially outwardly spaced from the center opening and one or more pins or rods are inserted into the bodies by way of these additional holes. In the illustrative embodiment, the pins are of such length as to extend to and between the spacers on opposite sides of a given foam body. While means such as adhesives and/or barbs may be used to create an attachment bond along the length of said one or more pins, it is also equally feasible to simply slide the pins into and through the bodies without the use of any adhering means whereby the foam plastic bodies are essentially caged on the one or more pins between the spacers. The pins may be attached to the spacers at one or both ends of the body of the foam plastic element.

An applicator assembly adapted to transfer dressing from a supply conduit to the sidewall of a rolling tire may be assembled by sliding a plurality of foam plastic applicator elements as described above onto a shaft until the necessary length is built up. For example, an applicator assembly may be on the order of 10 to 12 feet long so as to be capable of making progressive contact with the entirety of a passenger car tire sidewall as the car moves along.

In the preferred form the applicator elements are mounted on a shaft such as to be rotatable both with the shaft and relative to the shaft. Rotation with the shaft allows powered rotation of the elements between a dressing loading position and in this case, the rotation of the shaft with the elements thereon is incremental; i.e., less than 360° for each increment of rotation. The fact that the bodies may be rotatable relative to the shaft means that, although the shaft is stationary during the time dressing is being transferred from the foam plastic elements to the tire, the tire rotation forces turn the elements on the shaft, thus reducing the tendency for tire rotation to tear or damage the elements and force premature replacement thereof.

In accordance with the preferred embodiment of the invention, the support shaft is mounted in a bracket having a quick-release mechanism in one end and a pivot at the other end. By virtue of the quick-release mechanism and the pivot, the shaft can be released from the mounting bracket and worn roller element or elements removed by simply sliding them off of the shaft and replacing them with new elements. It has been found through practical experience that the elements do not wear at an even rate along the length of the shaft and, therefore, it is likely that only some of the elements will have to be replaced at any given time. This arrangement allows roller replacement rapidly and with minimum down time.

In accordance with the invention and the preferred embodiment thereof, the shaft is driven in any of several ways. One way to rotatably drive the shaft is to use a crank mechanism in combination with a linear actuator such as a power cylinder with an eccentric drive stroke to rotate the shaft incrementally. For example, the shaft may be rotated 90° every one or two minutes or upon the appearance of an automobile having chosen the tire dressing option at the entry to the car wash. The shaft may also be incrementally rotated two or three times as a vehicle approaches to load the roller or rollers with dressing at the start of operations. Alternatively, the shaft can be rotated continuously and slowly to continually present a freshly loaded tire dressing surface as vehicles progress through the tire dressing application station. Either a linear actuator with crank or a motor and gear set can be used for this purpose. As will be apparent to those skilled in the art, a control system is typically used to turn the motor off to conserve energy when no vehicles are passing through the tire dressing station.

In accordance with the preferred embodiment of the invention, the rollers are constructed in a fashion which causes them to be particularly effective in maintaining shape during a tire dressing application procedure. In a preferred form, each roller comprises a cage made up of hard plastic end rings joined by two, three, four or more plastic pins. A toroidal volume of foam material such as polyurethane is mounted on the cage so as to extend fully between the end rings as well as fully encompassing the pins. The width of the roller can vary over a wide range. The radius of the foam toroidal roller is greater than the radius of the end rings, thereby to provide a tire sidewall contacting surface onto which the dressing is deployed for purposes of spreading it onto the tire sidewall. The pins are preferably secured to the foam in any of several ways. For example, the pins may be hollow and provided with cross-drilled holes so that adhesive may be injected into the pins and outwardly into the foam to provide a secure bond between the foam and the gave along the full width thereof. Alternatively, the pins may be constructed with barbs which allow them to be inserted into holes in the foam but resist movement in the opposite direction; i.e., the direction a vehicle tends to push on the foam during contact treatment. As another alternative, the pins (or rods) may simply be inserted into holes in the elements without adhesive or barbs.

These and other advantages of the invention will be best understood from reading the following specification which describes the preferred embodiment of the invention in detail.

BRIEF DESCRIPTION OF THE DRAWINGS

The description herein makes reference to the accompanying drawings wherein like reference numerals refer to like parts throughout the several views and wherein.

DETAILED DESCRIPTION OF THE ILLUSTRATIVE EMBODIMENT

Referring now to FIGS. 1-8, there is shown a tire dressing application station 10 generally designed to be used in a conveyor-type car wash wherein vehicles to be washed are caused to travel along the length of a conveyor having tire guides 15 by means of a mechanism (not shown) which engages and pushes on the left front wheel. Accordingly, the left side of the vehicle is generally fixed relative to the station 10 whereas the right side of the vehicle varies in location depending on the width of the vehicle. For a better understanding of a usable conveyor system, the reader may refer to either or both of U.S. Pat. No. 4,576,098 issued Mar. 18, 1986 and assigned to Belanger, Inc., or published application no. 2007/0284223 dated Dec. 13, 2007, also assigned to Belanger, Inc.

Figure 1:
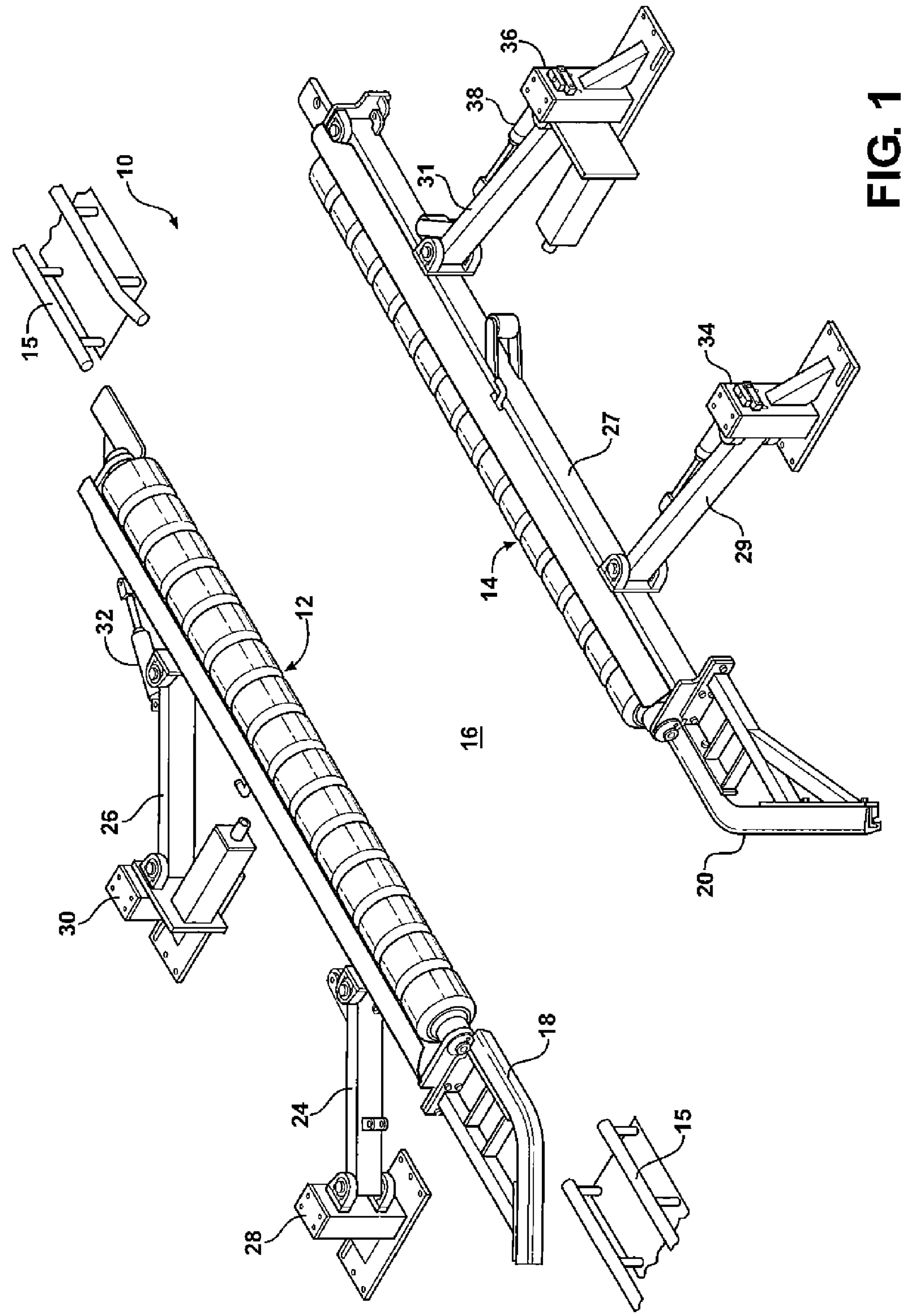
FIG. 1 is a perspective view of a two-sided tire dressing application station having two elongate sets of serial rollers, one on each side of a vehicle track extending from left to right between the roller as viewed in FIG. 1.

The tire dressing application station 10 comprises two parallel sets of non-reticulated polyurethane foam tire dressing application elements, also called "rollers", 12, 14 mounted on rotatable three-inch diameter stainless steel shafts 40 (FIGS. 2, 4 and 5) which are themselves generally adjacent and parallel to the vehicle path of travel 16 between the roller sets 12, 14. Entry guides 18, 20 are provided on opposite sides of the vehicle travel path 16 as shown in FIG. 1 and left side tire guides 15 which are part of the conveyor are also typically used, as persons skilled in the art of conveyor-type car washing installations will readily appreciate. While a two-sided system is typical and preferred, a single-sided system can also be used.

The support shaft 40 for foam rollers 12 is connected to a bracket 22 which is pivotally mounted to the outside ends of parallelogram arms 24, 26. These arms are in turn, pivotally mounted to support stanchions 28, 30 bolted to a concrete floor so that the set of rollers 12 may be moved in parallel fashion toward and away from a vehicle in the path of travel 16 as necessary to position the rollers 12 for contact with the sidewall of the tires of the vehicle passing along the left side of the path of travel 16. An hydraulic actuator 32 is provided for the purpose of moving the bracket 22 in and out. Further details of the manner in which the rollers 12 and the shaft 40 are connected to the bracket 22 will be provided with reference to FIGS. 2 and 3.

The opposite side roller set 14 is also mounted by means of a bracket 27 and pivotally mounted parallelogram arms 29, 31 to floor mounted stanchions 34, 36. Since the in and out travel needed to properly position the rollers 14 is greater than that of the opposite set of rollers 12 due to varying vehicle widths, the parallelogram arms 29, 31 are longer than the arms 24, 26 and the drive cylinder 38 is mounted in a somewhat different fashion.

Figure 2:
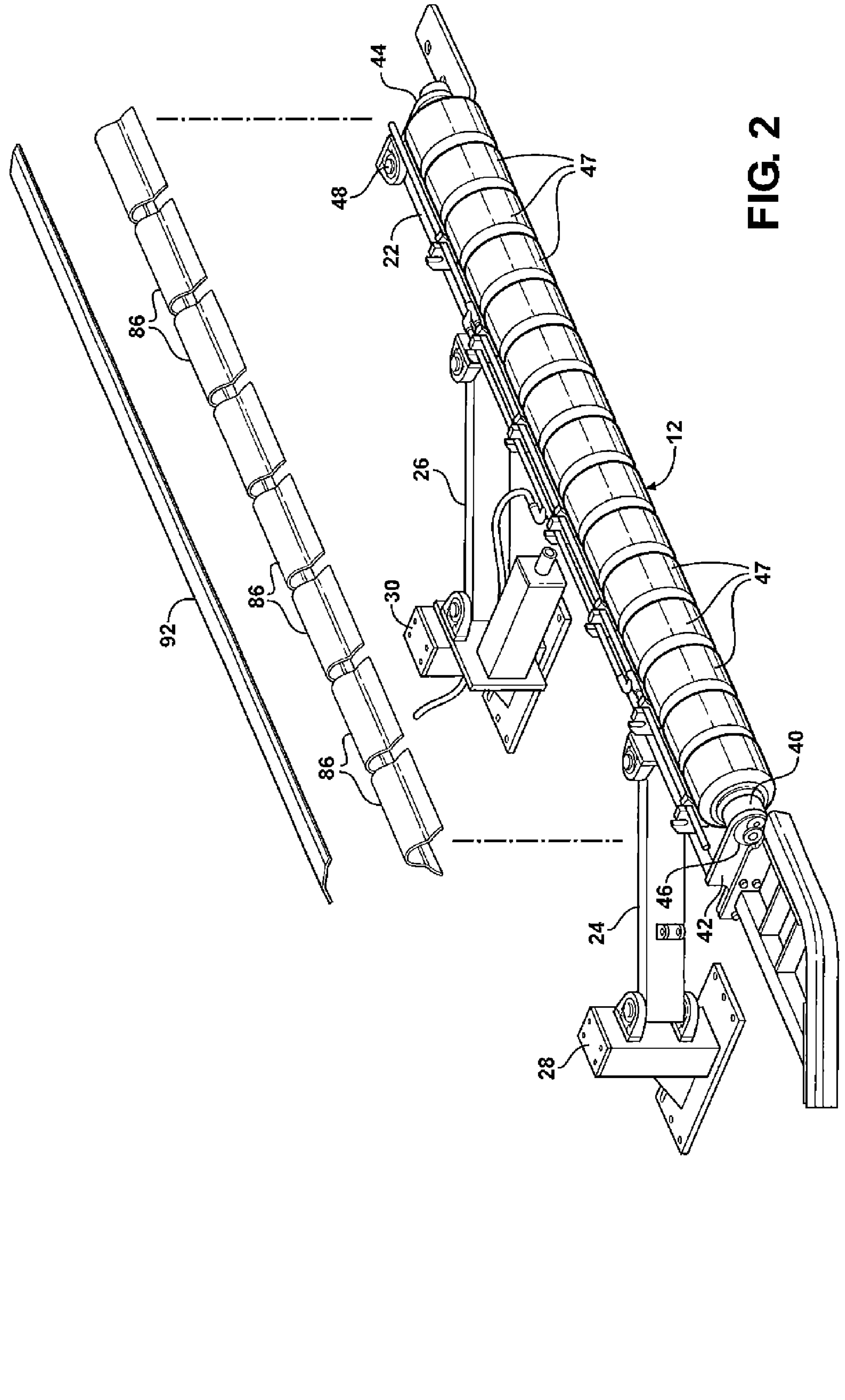
FIG. 2 is a perspective view of one of the sets of rollers from the installation of FIG. 1 showing various components of the system in detail.

Now that the overall nature of the installation has been described, details of only one side will be described with reference to FIGS. 2 through 5 with the understanding that, insofar as this description is concerned, the roller sets 12 and 14 are essentially alike. Referring to FIG. 2, the rollers 47 are shown mounted in a serial fashion on a shaft 40 between bracket ends 42, 44. At the bracket end 42, the shaft 40 is mounted by way of a quick-release latch mechanism 46 including a spring-biased pin which, when pulled out to the left as shown in FIG. 2, allows the shaft 40 to be disengaged from the bracket end 42. A pivot 48 on the opposite end of the shaft; i.e., near the bracket end 44, permits the shaft 40 and all of the rollers 47 to be moved outwardly from the bracket 22 for roller replacement purposes. Replacement is achieved simply by sliding the rollers 47 off of the shaft 40 and replacing them with new rollers as necessary.

Figure 3:
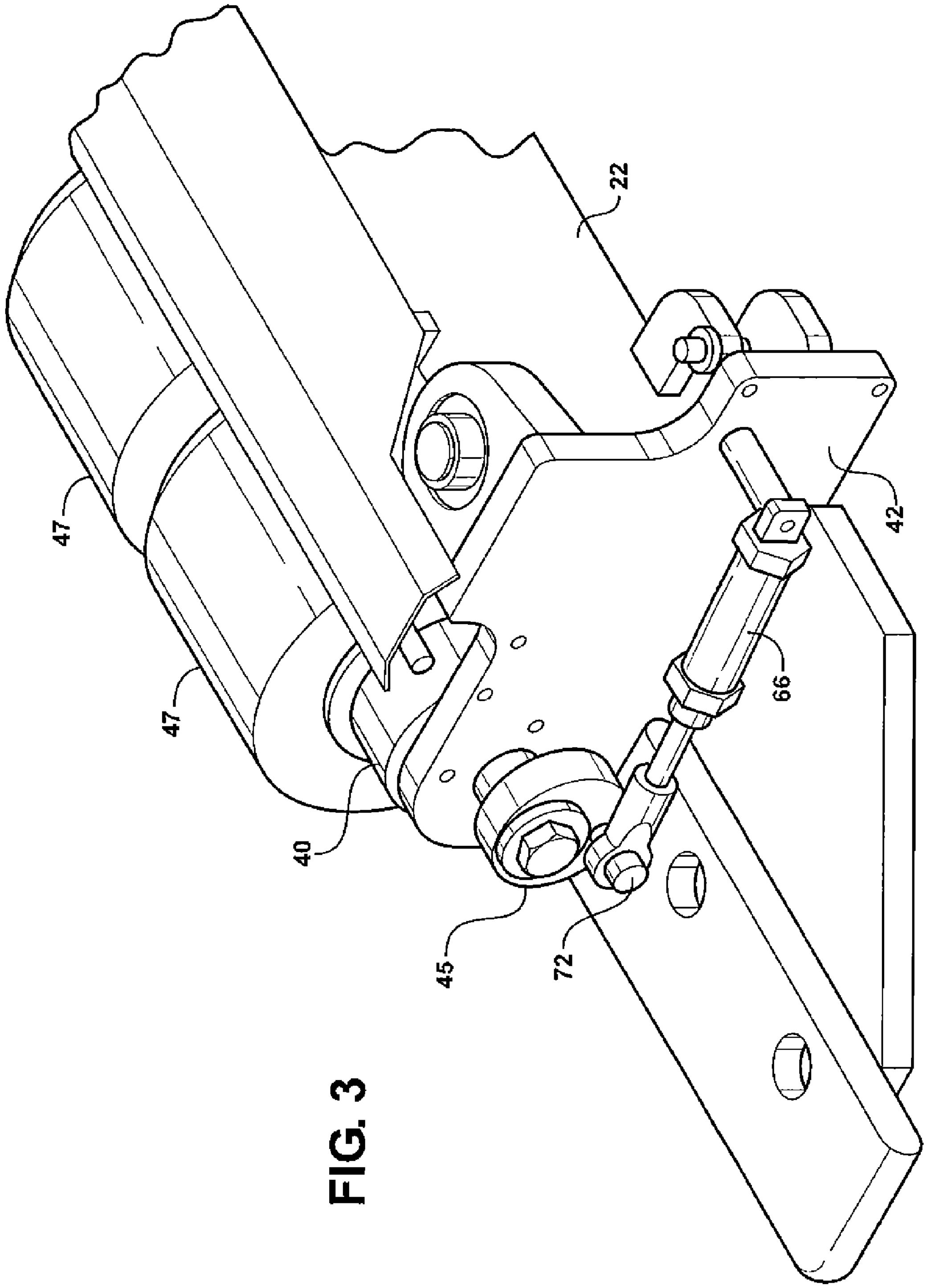
FIG. 3 is a perspective close-up of a portion of a system of FIG. 2 showing one of the available types of roller shaft drive mechanisms.

Referring to FIG. 3, the details of a shaft drive system are shown to comprise a wheel 45 which is eccentrically connected to the shaft 40 on which the rollers 47 are mounted so as to be rotated therewith. The wheel 45 is eccentrically mounted and is connected by fitting 72 to a linear actuator in the form of an hydraulic cylinder 66 having output shaft 68. The grounded end of the cylinder 66 is connected to a bracket 72 which, in turn, is connected to the end plate 44 of the bracket 22. The cylinder 66 operates in the fashion of a motor to incrementally and unidirectionally rotate the shaft 40 on which the rollers 14 are mounted. The timing of this incremental rotation, typically about 90°, may occur once every two or three minutes, or more rapidly after a rest period and immediately before a vehicle, which has selected the tire dressing application option, approaches the station 10.

Alternatively, the cylinder 66 may be replaced with a motor and gear set to rotate unidirectionally, continuously and slowly so as to produce continuous or near-continuous rotation of the rollers 47. For example, the rotation may be such that each roller 47 completes a 360° rotation, when rotating with the shaft 40, in about one or two minutes.

Figure 4:
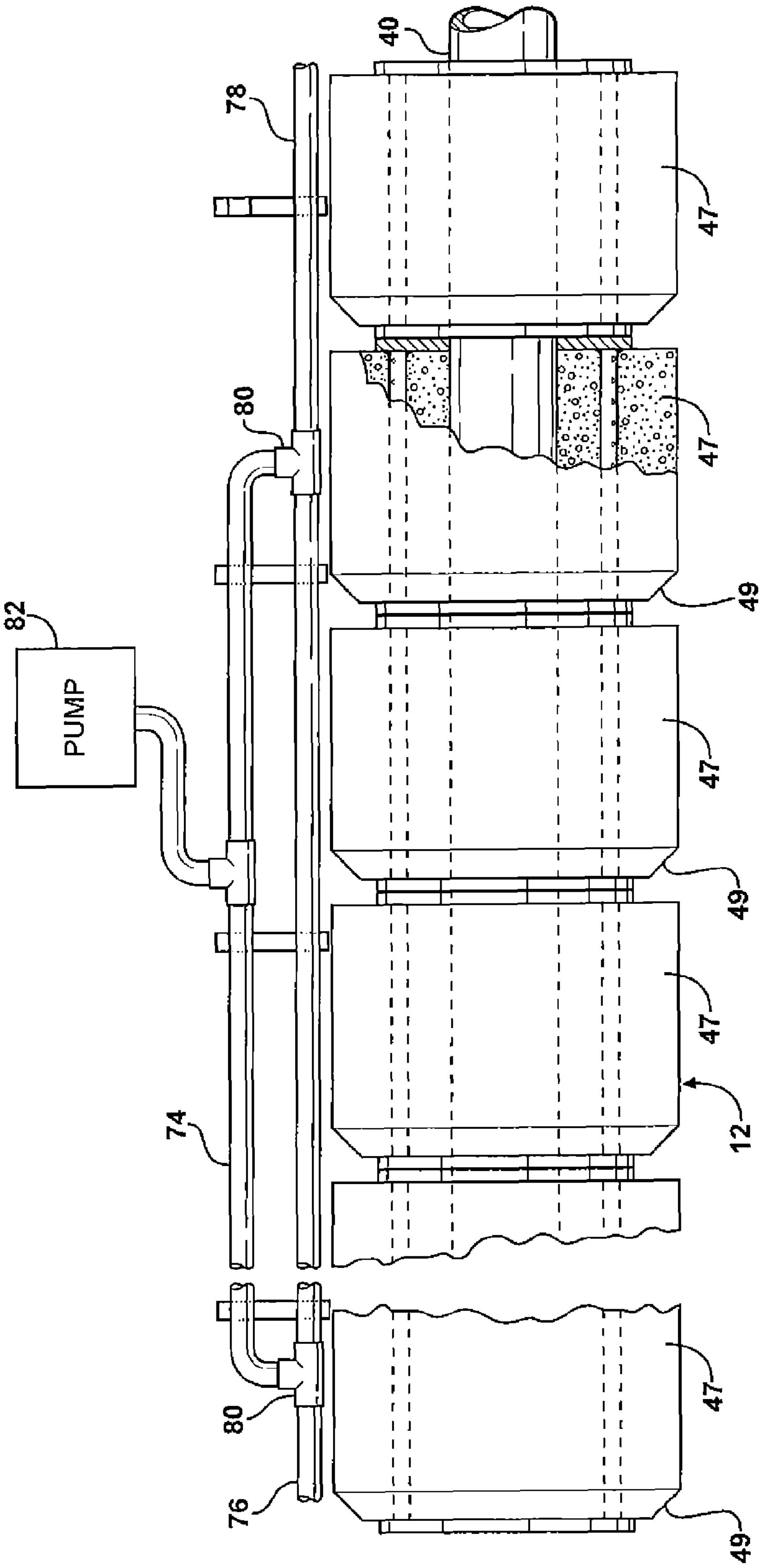
FIG. 4 is a detailed, partially sectioned view of a series of rollers showing the manner in which the rollers are constructed as well as the manner in which the rollers are mounted on a shaft so that dressing can be dispensed onto the upper surfaces of the rollers.
Figure 6:
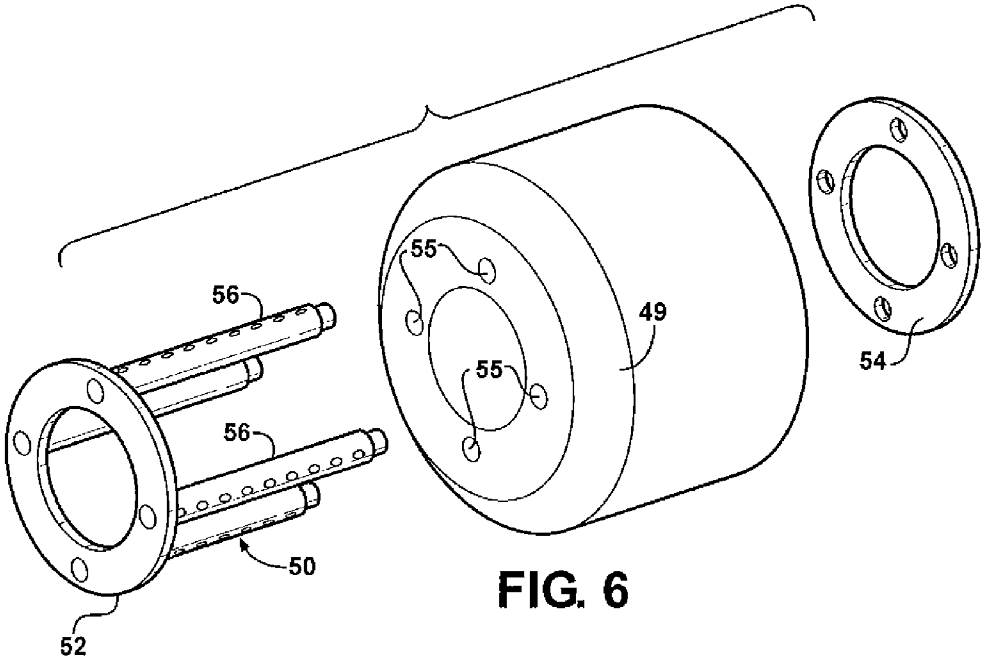
FIGS. 6 and 7 are perspective views of two different roller assemblies.
Figure 7:
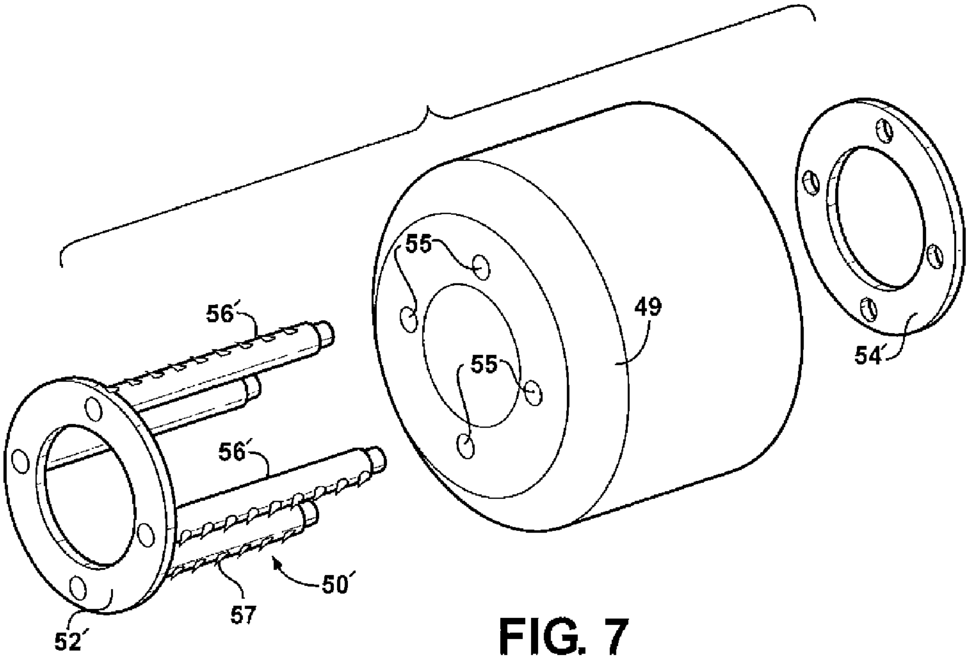

Referring to FIGS. 4, 6 and 7, the details of each roller 47 will be described in detail. In FIG. 4, the direction of vehicle travel is from left to right. As shown in the figures, each foam roller 47 comprises an internal cage 50 made up of hard plastic annular end rings 52, 54 connected by hollow plastic pins 56 which are permanently adhesively connected between the rings after the pins are slipped through the pre-formed holes 55 in rollers 47. This forms a cage. The pins or rods 56 are preferably, but not necessarily, cross-drilled and hollow so as to permit adhesive to be injected into and through them for purposes to be momentarily described.

FIG. 7 shows an alternative construction in which all components are given the same reference numbers as the corresponding components in FIG. 6 except the numbers are "primed" in FIG. 7. The difference is that the pins 56' of FIG. 7 are provided with the one-way barbs 57 which allow the pins 56' to enter the holes 55 in the foam rollers 47 during assembly, but resist reverse movement.

Figure 5:
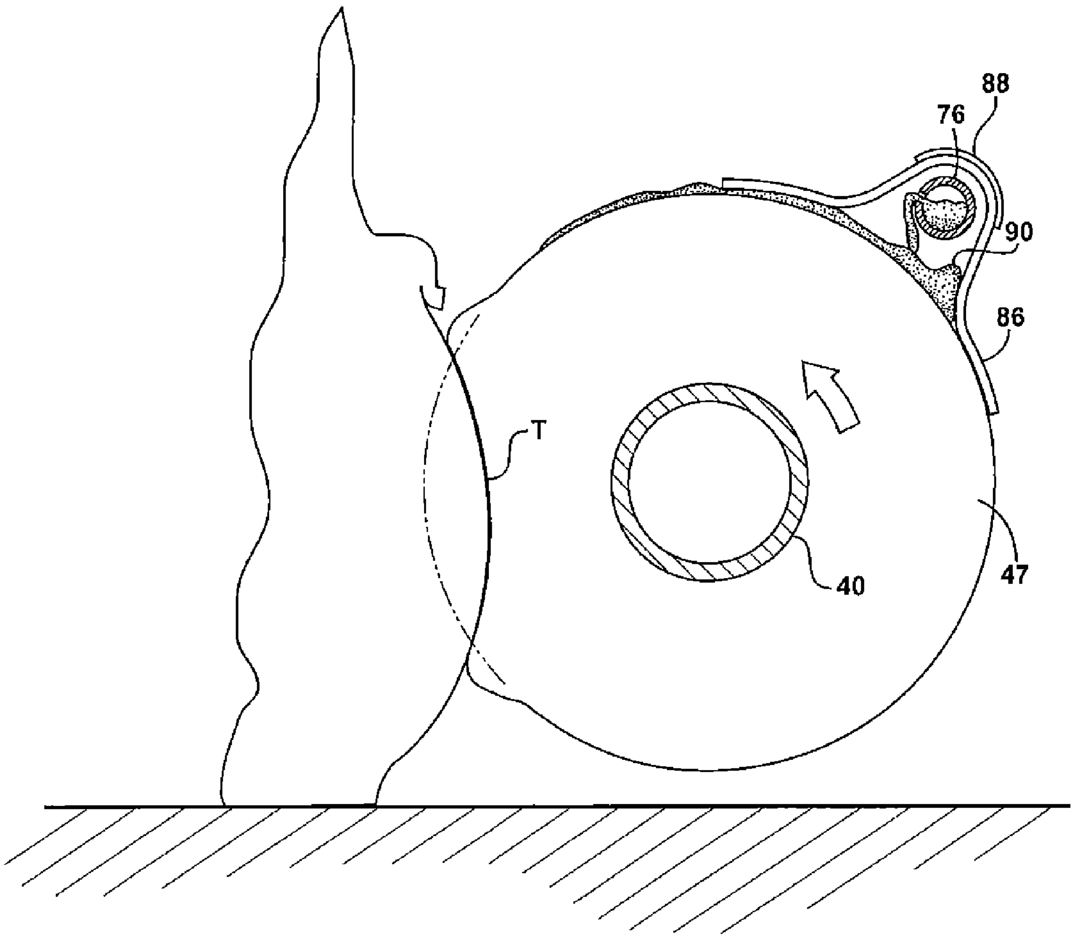
FIG. 5 is a side view of a roller showing how a spreader flap is arranged over a dressing dispenser pipe placed adjacent the outer tire contacting surface of the roller to distribute dressing over the roller surface and reduce waste.

The purpose of the adhesive and the barbs 57 is to prevent distortion of the foam rollers as they frictionally engage a tire sidewall as shown in FIG. 5; i.e., the friction will tend to cause the roller foam to bunch up and the adhesive or barbs prevent this. It also helps in this regard to provide a bevel 49 on the leading edge of each roller 47 in both sets 12 and 14 as shown in FIGS. 1, 2, 4, 5, 6 and 7.

Each roller 47 further comprises a toroidal volume of non-reticulated foam plastic mounted on the cage 50 so as to extend fully between the hard plastic end plates 52, 54 and to fully encompass the pins 56 which extend through apertures 55 through the toroidal foam volume. As stated above, adhesive may be injected into the pins 56 after the foam volume 58 is installed thereon so as to create an adhesive bond all along the width of the roller between the foam volume 58 and each of the pins 56. The adhesive can be applied other ways; for example, it may be applied to the pins in the form of tape loaded with an adhesive that is slippery when wet like that used to slide golf club shafts into rubber grips.

Referring further to FIGS. 2, 4, 5, 6 and 7, the dispensing system is shown to comprise a pump 82 connected by means of a T-fitting to a manifold or distribution pipe 74 which, in turn, is connected by T-fittings 80 to pipes 76,78 which run parallel to and immediately adjacent the outside tire contacting surfaces of the rollers 47 in the set 12. The pump is operated at a low pressure so as to cause the tire dressing 90 to be slowly pumped or "drizzled" rather than sprayed onto the outside surfaces of the rollers 47 at or near the top of each roller as shown in FIG. 5. A felt flap 86 is held in place by means of a clip 88 over the pipe 76 in such a way as to engage or nearly engage the outside surface of the roller 47 both before and after the surface passes by the pipe 76, thereby to dam up and spread the dressing 90 relative to the outside tire contacting surface of roller 47. This not only distributes or spreads the tire dressing 90 but also drives it into the pores of the foam plastic rollers so as to load up the rollers and prevent spraying, dripping or other types of dressing loss which add unnecessarily to the operating cost of the system. An aluminum cover 92 is provided as shown in FIG. 2.

Figure 8:
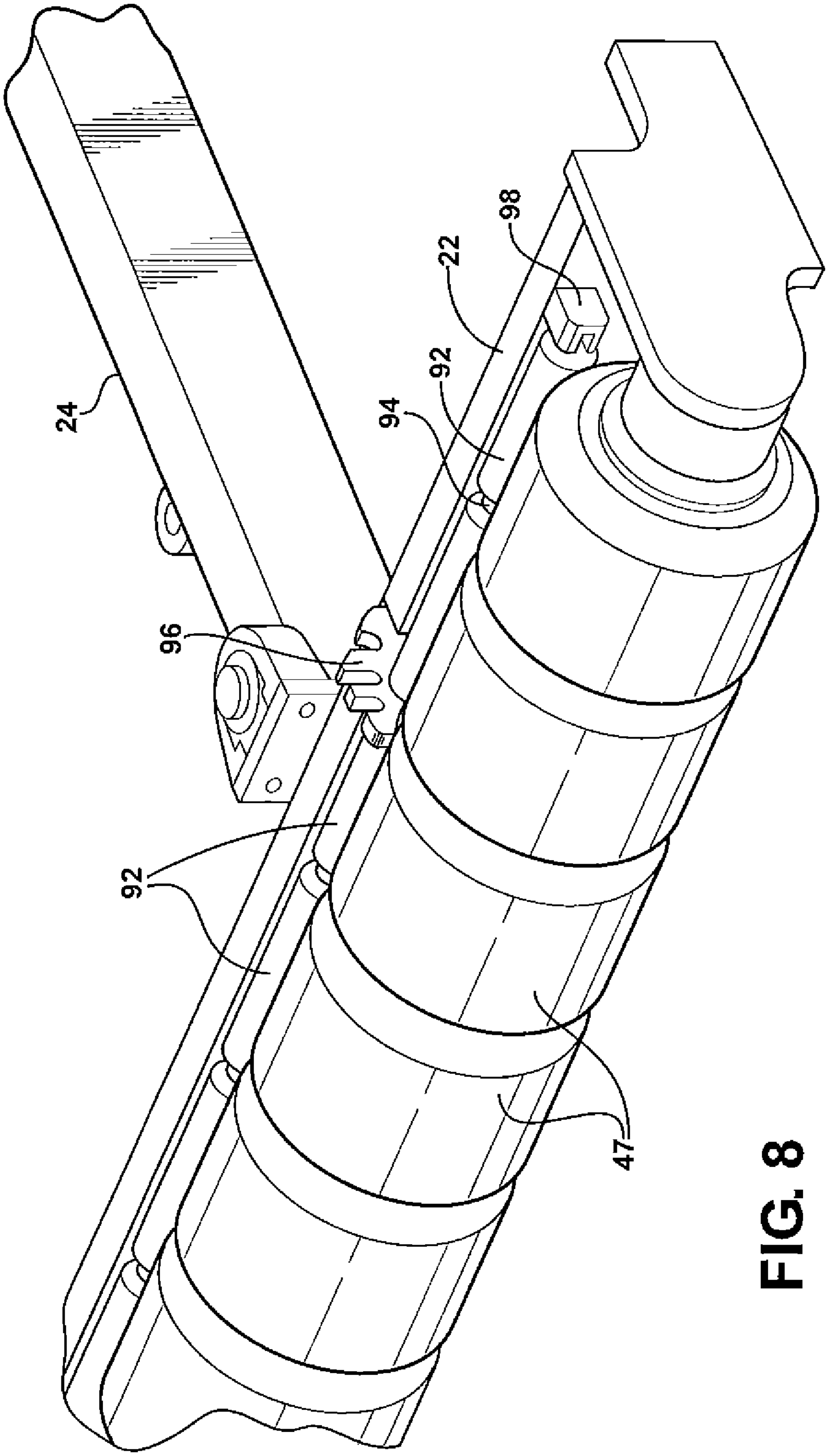
FIG. 8 is a perspective view of a series-roller applicator using idler rollers to spread dressing over the applicator rollers.

FIG. 8 illustrates an alternative to the felt flap 86 for spreading dressing over the surfaces of rollers 47. In FIG. 8, foam idler rollers 92 are mounted on a shaft 94 which is parallel to shaft 40 and rotatably mounted by and between brackets 96 and 98. There is a roller 92 for each roller 47 and their outer surfaces engage each other like gears. Rollers 92 may be made of any suitable material, but can be conveniently made from the cores which are removed from the rollers 47 to create the center opening which receives shafts 40. Rollers 92 are un-driven idler rollers which spread dressing essentially in the same way as flap 86.

There are a variety of changes and modifications which can be made to the system as described. Some such modifications are described in our co-pending application Ser. No. 12/062,996 filed Apr. 4, 2008, the disclosure of which is incorporated herein by reference. The present invention is believed, at this time, to be optimum in conserving dressing, accommodating different types of dressing including both water-based and oil-based dressing, promoting long life in the roller elements, making replacement as simple and fast as possible and generally providing effective and efficient transfer of dressing from the dispensing system to the sidewalls of the tires T on vehicles passing through a commercial car wash. The rollers described in this document have been found to have long life and effective operation in holding all types of tire dressing including the more runny or liquid water-based dressings, in such a way as to prevent unnecessary loss or waste thereof. The overall length of the system described herein is typically approximately six to ten feet and may use as many rollers as the designer finds practical. Rollers 47 may be about 8 inches wide, but wide variations in this dimension are possible as explained above.

A feature of the present invention is the fact that the rollers 47 can be driven by an actuator or motor, but are nevertheless free to rotate to accommodate the relative vertical motion of a passing tire sidewall. To achieve this freedom, rollers 47 are mounted on their respective drive shafts 40 in a frictional fashion, so that they can rotate both with and relative to the drive shafts. Rotation with the shafts 40 is the normal situation when the rollers are not in contact with the vehicle tire sidewall; e.g., when the rollers are being loaded with tire dressing prior to the approach of a vehicle. When the incremental shaft rotation of motor 66, 68 is operated, all of the rollers 14 rotate with the shaft in unison. However, when a tire sidewall is engaging the outer surfaces of the rollers 14 or any one or more of them, such contact may prevent rotation of the particular roller or rollers with their support shaft or, instead, cause rotation relative to the shaft due to the relative up or down travel direction of the tire sidewall relative to the outside surface of the contacting roller or rollers. By permitting rollers to rotate on the shaft as well as with the shaft, unnecessary wear of the roller material is greatly reduced or eliminated. A similar or equivalent function can be achieved in other ways; an example is to create the freedom of roller rotation through the use of a clutch which disengages the shaft drive between increments and allows the entire assembly of shaft 40 and rollers 47 to rotate as necessary when engaged by a tire sidewall.

What is claimed is:

1. A roller for use in a tire dressing applicator comprising:

a toroidal body of absorbent cellular foam plastic material having a continuous cylindrical tire contacting outer surface configured to transfer tire dressing to an automotive tire side wall;

said body having a longitudinal axis of rotation, and a cylindrical through bore formed therein along said axis of rotation configured to friction mount on a shaft; and a plurality of circumferentially spaced elongate pins of a length substantially equal to the axial length of said body and extending through the foam plastic material radially outwardly spaced from said cylindrical through bore and inserted into the foam plastic material to reduce distortion of said body during transfer of the tire dressing to an automotive tire side wall.

2. A roller as defined in claim 1 wherein the pins are attached to the foam plastic material.

3. A roller as defined in claim 2 wherein the pins are attached by adhesive.

* * * * *